United States Patent
Biran et al.

(10) Patent No.: US 11,665,142 B2
(45) Date of Patent: *May 30, 2023

(54) DYNAMIC DISCOVERY OF EXECUTING APPLICATIONS

(71) Applicant: ServiceNow, Inc., Santa Clara, CA (US)

(72) Inventors: Noam Biran, Kfar Menachem (IL); Amit Dhuleshia, San Diego, CA (US); Sreenevas Subramaniam, Dublin, CA (US)

(73) Assignee: ServiceNow, Inc., Santa Clara, CA (US)

(*) Notice: Subject to any disclaimer, the term of this patent is extended or adjusted under 35 U.S.C. 154(b) by 115 days.

This patent is subject to a terminal disclaimer.

(21) Appl. No.: 17/301,198

(22) Filed: Mar. 29, 2021

(65) Prior Publication Data

US 2021/0218711 A1 Jul. 15, 2021

Related U.S. Application Data

(63) Continuation of application No. 16/122,311, filed on Sep. 5, 2018, now Pat. No. 10,972,435.

(51) Int. Cl.
*H04L 9/40* (2022.01)
*H04L 9/32* (2006.01)
(Continued)

(52) U.S. Cl.
CPC ........ *H04L 63/0281* (2013.01); *G06F 16/183* (2019.01); *G06F 21/55* (2013.01); *H04L 9/3242* (2013.01); *H04L 67/56* (2022.05)

(58) Field of Classification Search
CPC ... H04L 63/0281; H04L 9/3242; H04L 67/56; H04L 9/3236; H04L 63/1433;
(Continued)

(56) References Cited

U.S. PATENT DOCUMENTS 5,864,852 A ‡ 1/1999 Luotonen .............. H04L 61/301
726/14
5,978,594 A ‡ 11/1999 Bonnell .................... G06F 9/50
710/17
(Continued)

FOREIGN PATENT DOCUMENTS

WO WO 2004/104739 A2 * 12/2004 ............. G06Q 10/06

*Primary Examiner* — Christopher A Revak
(74) *Attorney, Agent, or Firm* — Fletcher Yoder PC

(57) ABSTRACT

A computing system may include a proxy server application and a database. The proxy server application may provide, to a computing device disposed within a managed network, instructions to identify one or more processes executing on the computing device. The proxy server application may also determine, for a process of the one or more processes, a file system path of a directory associated with the process and, based thereon, select one or more directories to scan for files associated with the process. The computing device may be provided with instructions to (i) scan the one or more directories and (ii) determine a plurality of attributes associated with one or more files discovered therein. The proxy server application may additionally receive results of the scan containing a representation of the plurality of attributes and store, in the database, the results of the scan.

20 Claims, 11 Drawing Sheets

(51) Int. Cl.
*G06F 16/182* (2019.01)
*H04L 67/56* (2022.01)
*G06F 21/55* (2013.01)

(58) Field of Classification Search
CPC ..... H04L 67/51; H04L 9/0643; G06F 16/183; G06F 21/55; G06F 21/52; G06F 21/56
See application file for complete search history.

(56) References Cited

U.S. PATENT DOCUMENTS

| | | | | |
|---|---|---|---|---|
| 6,321,229 B1 ‡ | 11/2001 | Goldman | ............ | G06F 16/9027 |
| 6,799,189 B2 ‡ | 9/2004 | Huxoll | ................ | G06F 11/1471 |
| 6,816,898 B1 ‡ | 11/2004 | Scarpelli | ................ | H04L 41/50 |
| | | | | 709/223 |
| 6,895,586 B1 ‡ | 5/2005 | Brasher | ................ | G06F 9/465 |
| | | | | 709/201 |
| 7,020,706 B2 ‡ | 3/2006 | Cates | ................ | H04L 67/1002 |
| | | | | 709/229 |
| 7,027,411 B1 ‡ | 4/2006 | Pulsipher | ................ | H04L 41/12 |
| | | | | 370/254 |
| 7,383,286 B2 ‡ | 6/2008 | Hamanaka | ............. | G06F 16/10 |
| | | | | 707/694 |
| 7,392,300 B2 ‡ | 6/2008 | Anantharangachar | ....................... | |
| | | | | H04L 41/12 |
| | | | | 370/254 |
| 7,617,073 B2 ‡ | 11/2009 | Trinon | ................ | G06F 11/008 |
| | | | | 702/183 |
| 7,685,167 B2 ‡ | 3/2010 | Mueller | ................ | G06Q 10/06 |
| | | | | 707/999.2 |
| 7,716,353 B2 ‡ | 5/2010 | Golovinsky | .......... | G06F 16/958 |
| | | | | 709/229 |
| 7,739,278 B1 ‡ | 6/2010 | Sobel | ................ | G06F 16/10 |
| | | | | 707/728 |
| 7,769,718 B2 ‡ | 8/2010 | Murley | ............... | G06F 16/2308 |
| | | | | 707/649 |
| 7,877,783 B1 ‡ | 1/2011 | Cline | ................ | H04L 41/00 |
| | | | | 726/2 |
| 7,925,981 B2 ‡ | 4/2011 | Pourheidari | ............ | H04L 67/02 |
| | | | | 715/744 |
| 7,941,506 B2 ‡ | 5/2011 | Bonal | ................ | H04L 41/22 |
| | | | | 709/220 |
| 7,945,860 B2 ‡ | 5/2011 | Vambenepe | ........... | G06Q 30/06 |
| | | | | 715/744 |
| 8,082,222 B2 ‡ | 12/2011 | Rangarajan | ........... | G06F 16/256 |
| | | | | 707/609 |
| 8,224,683 B2 ‡ | 7/2012 | Manos | ........... | G06Q 10/063114 |
| | | | | 705/7.15 |
| 8,346,752 B2 ‡ | 1/2013 | Sirota | ................ | G06F 8/60 |
| | | | | 707/708 |
| 8,380,645 B2 ‡ | 2/2013 | Kowalski | .......... | G06F 16/90332 |
| | | | | 706/12 |
| 8,402,127 B2 ‡ | 3/2013 | Solin | .................... | G06F 9/5072 |
| | | | | 709/223 |
| 8,554,750 B2 ‡ | 10/2013 | Rangarajan | ......... | G06F 16/2365 |
| | | | | 707/694 |
| 8,554,809 B1 * | 10/2013 | Zhou | ..................... | G06F 16/122 |
| | | | | 707/821 |
| 8,612,408 B2 ‡ | 12/2013 | Trinon | ................ | G06F 16/2379 |
| | | | | 707/705 |
| 8,646,093 B2 ‡ | 2/2014 | Myers | ................... | G06F 21/105 |
| | | | | 726/26 |
| 8,683,032 B2 ‡ | 3/2014 | Spinelli | ............... | H04L 43/0811 |
| | | | | 709/224 |
| 8,745,040 B2 ‡ | 6/2014 | Kowalski | ................ | G06F 16/26 |
| | | | | 707/722 |
| 8,776,226 B2 | 7/2014 | Glick | | |
| 8,776,227 B1 ‡ | 7/2014 | Glick | .................... | G06F 21/566 |
| | | | | 726/23 |
| 8,812,539 B2 ‡ | 8/2014 | Milousheff | ......... | G06F 16/2365 |
| | | | | 707/769 |
| 8,818,994 B2 ‡ | 8/2014 | Kowalski | ................ | G06Q 10/00 |
| | | | | 707/722 |
| 8,832,652 B2 ‡ | 9/2014 | Mueller | .................... | G06F 8/71 |
| | | | | 717/121 |
| 8,892,531 B2 ‡ | 11/2014 | Kaplan | .................... | G06F 16/11 |
| | | | | 707/694 |
| 8,907,988 B2 ‡ | 12/2014 | Poston | ....................... | G06T 3/40 |
| | | | | 345/660 |
| 9,015,188 B2 ‡ | 4/2015 | Behne | ................ | G06F 16/2365 |
| | | | | 707/769 |
| 9,015,841 B2 ‡ | 4/2015 | Guo | ........................ | G06F 21/566 |
| | | | | 726/24 |
| 9,037,536 B2 ‡ | 4/2015 | Vos | ........................ | G06F 16/217 |
| | | | | 707/608 |
| 9,098,322 B2 ‡ | 8/2015 | Apte | ......................... | G06F 8/65 |
| 9,137,115 B2 ‡ | 9/2015 | Mayfield | ................ | G06Q 10/06 |
| 9,261,372 B2 ‡ | 2/2016 | Cline | ..................... | H04W 4/023 |
| 9,317,327 B2 ‡ | 4/2016 | Apte | ......................... | G06F 9/50 |
| 9,323,801 B2 ‡ | 4/2016 | Morozov | .............. | G06F 16/285 |
| 9,363,252 B2 ‡ | 6/2016 | Mueller | ...................... | G06F 8/71 |
| 9,412,084 B2 ‡ | 9/2016 | Kowalski | ............ | G06Q 10/0639 |
| 9,467,344 B2 ‡ | 10/2016 | Gere | ..................... | G06F 16/2465 |
| 9,534,903 B2 ‡ | 1/2017 | Cline | ..................... | H04W 4/021 |
| 9,557,969 B2 ‡ | 1/2017 | Sharma | ...................... | G06F 8/35 |
| 9,613,070 B2 ‡ | 4/2017 | Kumar | .................. | G06F 16/9024 |
| 9,631,934 B2 ‡ | 4/2017 | Cline | .................... | G06F 16/245 |
| 9,654,473 B2 ‡ | 4/2017 | Miller | ................ | H04L 63/0884 |
| 9,645,833 B2 ‡ | 5/2017 | Mueller | ............... | G06F 9/44505 |
| 9,659,041 B2 ‡ | 5/2017 | Sambamurthy | ....... | G06F 16/219 |
| 9,766,935 B2 ‡ | 9/2017 | Kelkar | .................. | G06F 9/4881 |
| 9,792,387 B2 ‡ | 10/2017 | George | .................. | H04L 67/10 |
| 9,805,322 B2 ‡ | 10/2017 | Kelkar | ...................... | G06F 8/71 |
| 9,967,162 B2 ‡ | 5/2018 | Spinelli | .................. | H04L 29/06 |
| 10,002,203 B2 ‡ | 6/2018 | George | .................. | G06F 16/211 |
| 10,972,435 B2 * | 4/2021 | Biran | ..................... | G06F 21/55 |
| 2013/0246782 A1 ‡ | 9/2013 | Flores | ................... | G06F 9/5061 |
| | | | | 713/100 |

* cited by examiner
‡ imported from a related application

700 → [proxy_app@computing_device_1]: ps

701 → | PID | USER | START | COMMAND |
|---|---|---|---|
702 → | 1 | ROOT | 12:38 | sys_program_1 |
703 → | 2 | ROOT | 12:38 | sys_program_2 |
704 → | 3 | USER_1 | 12:39 | program_1 |
705 → | 4 | USER_1 | 12:40 | program_20 |
706 → | ... | ... | ... | ... |
707 → | 1150 | USER_1 | 1:35 | program_30 |

FIG. 7A

708 → [proxy_app@computing_device_1]: pwdx 3

709 → /usr/bin

710 → [proxy_app@computing_device_1]: cd /usr/bin

711 → [proxy_app@computing_device_1]: ls

712 → program_1  program_2  program_3  program_4  program_5  program_6  program_7

713 → program_8  file_2  program_20_directory  program_30_directory

FIG. 7B

```
714 → [proxy_app@computing_device_1]: pwdx 4
715 → /usr/bin/program_20_directory 716 → [proxy_app@computing_device_1]: cd /usr/bin/program_20_directory
717 → [proxy_app@computing_device_1]: ls
718 → program_20_file_1   program_20_file_2   program_20_file_3   program_20_file_4
719 → program_20_file_5   program_20_file_6
```

FIG. 7C

```
720 → [proxy_app@computing_device_1]: lsof -p 1150
721 → /bin/file_1
722 → /lib/library_function_1
723 → /usr/bin/file_2
724 → /usr/bin/program_30_directory/file_3
725 → /usr/bin/program_30_directory/file_4
```

FIG. 7D

DYNAMIC DISCOVERY OF EXECUTING APPLICATIONS

CROSS-REFERENCE TO RELATED APPLICATIONS

This application is a continuation of and claims priority to U.S. patent application Ser. No. 16/122,311, filed Sep. 5, 2018, which is hereby incorporated by reference in its entirety.

BACKGROUND

Remote network management platforms allow computer networks to be managed by way of cloud-based devices and services. Advantageously, these architectures simplify the provisioning and operation of managed networks, including computing devices, software applications, and configurational relationships therebetween present in such managed networks. These different aspects of managed networks may be identified by discovery operations carried out across computing devices within the managed network. However, different managed networks may organize the computing devices and software applications found therein in a number of ways. Thus, it may be difficult to predefine discovery operations that are effective for a wide variety of managed networks.

SUMMARY

Discovery operations often involve scanning computing devices within a managed network to identify the computing devices, software products on the computing devices, and various relationships therebetween. Discovery proceeds according to a predetermined set of discovery criteria or patterns which may identify, among other things, file system directories to be scanned, file types to be scanned for, and/or specific files to be located. However, such predetermined discovery criteria are often inflexible in that the criteria that result in discovery of a large number of files on one computing device might not work as well for another computing device using a different operating system and/or arranged according to conventions of a different managed network. Accordingly, such predefined criteria-based discovery might not scale and adapt well to differences between computing devices or managed networks as well as changes made over time within one computing device or managed network.

Accurate and scalable discovery is important for multiple reasons. First, discovery allows for efficient management of software products. For example, by discovering the number of copies of a software product installed within a managed network, a number of licenses needed therefor can be determined and/or adjusted. Second, discovery allows for security threats to be identified and mitigated. Namely, by attempting to map each discovered occurrence of a software product to a known, trusted software product, software that does not find a match to a known, trusted software product can be flagged for review by security software or personnel. When the software is deemed safe, the set of known, trusted software product may be expanded to include this newly-discovered software. Third, discovery allows for monitoring of the state of the managed network to identify any issues therewith and allows adjustments to be made to the managed network to meet desired performance specifications, among other benefits.

The speed, scalability, and coverage of discovery operations may be improved by selecting directories to be scanned for files and other resources based on software processes that are executing on a computing device at a given point in time. That is, rather than following predetermined criteria in organizing or planning the discovery operations, the discovery operations may be targeted or focused on file system directories associated with executing software processes. Thus, the discovery operations may scan file system directories likely to contain files of interest instead of indiscriminately scanning a large number of directories without knowing beforehand whether files of interest are contained therein. As a result, the discovery operations may involve scanning a small number of directories instead of scanning an entire file system tree of a computing device, thereby increasing the rate of discovery of configuration items and decreasing the amount of computing resources used in the process. This approach to discovery may be referred to herein as software process-based discovery.

Notably, a single software process-based scan might not discover files corresponding to software products that are not being executed at the time of discovery. Accordingly, the process-based discovery may be repeated periodically, at random time intervals, or in response to initiation of execution of a software process to increase the probability of discovering as many configuration items as possible for a given computing device. Process-based discovery may expend fewer resources and take less time to execute than traditional pattern-based discovery even when repeated over time to discover software products that may be executing at different times.

Process-based discovery for a client device within a managed network may involve requesting that the client device identify software processes executing thereon. The request to the client device may be provided by way of an operating system shell (e.g., a command line shell) of the client device, thus allowing existing functionality of the client device to be used to assist the discovery operations. For any identified processes of interest, directories associated with the process may be identified. In one example, directories associated with a respective process may be identified by requesting that the client device determine and provide a working directory associated with the respective process (e.g., a directory in which an executable file associated with the respective process is stored). In another example, directories associated with the respective process may be identified by requesting that the client device determine and provide directories of any files accessed by the respective process.

The identified directories may subsequently be scanned for files associated with the software product. The client device may be provided with instructions to determine a plurality of attributes for each file, including, for example, file name, file size, checksum, file owner, and file read-write-access privileges. The scan results, including discovered files and their corresponding attributes, may be processed and/or stored in a database as configuration items. In one example, a hash, such as a cryptographic hash or signature, may be determined for each file. The cryptographic signature may then be referenced against a database of cryptographic signatures corresponding to a plurality of known and trusted software products. Thus, discovered files may be mapped to a known software product or, when a mapping cannot be determined, the discovered files may be flagged as potential security threats and reviewed by security software or personnel. When such a review indicates that the discovered files are not security threats, their respective cryptographic signatures may be added to the signature database along with a name or title of a corresponding software product, thus expanding the signature database of known and trusted software products.

In addition to identifying files or software products that constitute potential security threats, process-based discovery may also be used to identify potentially malicious processes executing on a computing device. Namely, when a working directory for a process does not contain therein an executable file corresponding to that process, the process may be identified as a potential security threat. That is, the process may be a security threat injected into program memory but having no corresponding file stored in non-volatile memory. Additionally or alternatively, a process may be identified as a potential security threat when the files in the working directory of the process do not match the files expected to be stored in that directory for that process. In response to identifying a process as a security threat, instructions may be provided to security software to analyze and potentially terminate the process if it is deemed a security threat.

Although software process-based discovery may be more efficient than traditional discovery, the two approaches may nevertheless be used in combination. For example, process-based discovery may be executed at a higher frequency than traditional discovery due to process-based discovery taking less time and resources to execute. On the other hand, traditional discovery may provide a more thorough coverage of directories containing software products that are executed infrequently or are not executed at all. Thus, a difference between configuration items discovered by process-based discovery and traditional discovery may be used to identify unused software products, thereby allowing the number of software licenses to be reduced and computing resources to be freed.

Software process-based discovery may be facilitated by a proxy server application. The proxy server application may be disposed on a proxy server within the managed network, on the computing device undergoing discovery, or within the remote network management platform configured to managed the manage network, among other possibilities. However, functions of the proxy server application may also be distributed among the proxy server, the computing device undergoing discovery, or the remote network management platform. To that end, in some implementations, the proxy server application may include two or more modules distributed between the proxy server, the computing device undergoing discovery, and/or computational instances of the remote network management platform. Thus, discovery may involve various modules of the proxy server application and/or various computing devices communicating with one another to gather and process the discovered configuration items.

Accordingly, a first example embodiment may involve a computing system including a database disposed within a remote network management platform and a proxy server application disposed within a managed network. The managed network is managed by the remote network management platform and the proxy server application is controlled by the remote network management platform. The proxy server application is configured to provide, to a computing device disposed within the managed network, instructions to identify one or more processes executing on the computing device. The proxy server application is also configured to determine, for a process of the one or more processes that were identified, a file system path of a directory associated with the process. The proxy server application is additionally configured to, based on the file system path, select one or more directories to scan for files associated with the process. The proxy server application is further configured to provide, to the computing device, instructions to: (i) scan the one or more directories for files and (ii) determine a plurality of attributes associated with one or more files discovered in the one or more directories. The proxy server application is yet further configured to receive, from the computing device, results of the scan containing a representation of the plurality of attributes associated with each file and store, in the database, the results of the scan as configuration items of the managed network.

In a second example embodiment, an article of manufacture may include a non-transitory computer-readable medium, having stored thereon program instructions that, upon execution by a computing system, cause the computing system to perform operations. The operations include providing, to a computing device disposed within a managed network, instructions to identify one or more processes executing on the computing device. The managed network is managed by a remote network management platform. The operations also include determining, for a process of the one or more processes that were identified, a file system path of a directory associated with the process. The operations additionally include, based on the file system path, selecting one or more directories to scan for files associated with the process. The operations further include providing, to the computing device, instructions to: (i) scan the one or more directories for files and (ii) determine a plurality of attributes associated with one or more files discovered in the one or more directories. The operations yet further include receiving, from the computing device, results of the scan containing a representation of the plurality of attributes associated with each file and storing, in a database disposed within the remote network management platform, the results of the scan as configuration items of the managed network.

A third example embodiment includes providing, by a proxy server application disposed within a managed network and to a computing device disposed within the managed network, instructions to identify one or more processes executing on the computing device. The managed network is managed by a remote network management platform and the proxy server application is controlled by the remote network management platform. The third embodiment also includes determining, by the proxy server application and for a process of the one or more processes that were identified, a file system path of a directory associated with the process. The third embodiment additionally includes, based on the file system path, selecting, by the proxy server application, one or more directories to scan for files associated with the process. The third embodiment further includes providing, by the proxy server application and to the computing device, instructions to: (i) scan the one or more directories for files and (ii) determine a plurality of attributes associated with one or more files discovered in the one or more directories. The third embodiment yet further includes receiving, by the proxy server application from the computing device, results of the scan containing a representation of the plurality of attributes associated with each file and storing, by the proxy server application and in a database disposed within the remote network management platform, the results of the scan as configuration items of the managed network.

In a fourth example embodiment, a computing system may include at least one processor, as well as memory and program instructions. The program instructions may be stored in the memory, and upon execution by the at least one processor, cause the computing system to perform operations in accordance with the third example embodiment.

In a fifth example embodiment, a system includes means disposed within a managed network for providing, to a computing device disposed within the managed network, instructions to identify one or more processes executing on the computing device. The managed network is managed by a remote network management platform. The system also includes means for determining, for a process of the one or more processes that were identified, a file system path of a directory associated with the process. The system additionally includes means for, based on the file system path, selecting one or more directories to scan for files associated with the process. The system further includes means for providing, to the computing device, instructions to: (i) scan the one or more directories for files and (ii) determine a plurality of attributes associated with one or more files discovered in the one or more directories. The system further includes means for receiving, from the computing device, results of the scan containing a representation of the plurality of attributes associated with each file. The system yet additionally includes means for storing, in a database disposed within the remote network management platform, the results of the scan as configuration items of the managed network.

These as well as other embodiments, aspects, advantages, and alternatives will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIGS. 7A, 7B, 7C, and 7D depict example operating system shell instructions, in accordance with example embodiments.

DETAILED DESCRIPTION

Figure 1:
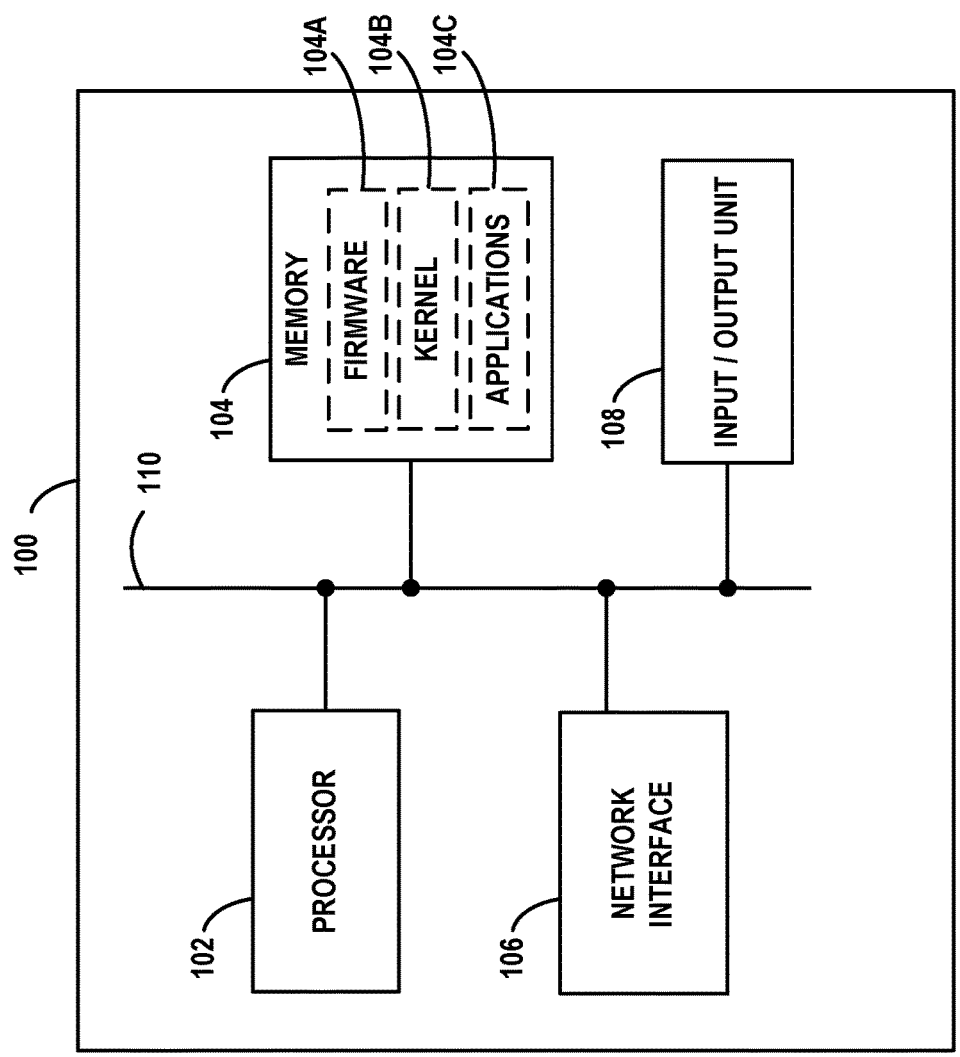
FIG. 1 illustrates a schematic drawing of a computing device, in accordance with example embodiments.

Example methods, devices, and systems are described herein. It should be understood that the words "example"

and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. INTRODUCTION

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data is stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. EXAMPLE COMPUTING DEVICES AND CLOUD-BASED COMPUTING ENVIRONMENTS

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more userspace software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with example computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more instances of computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
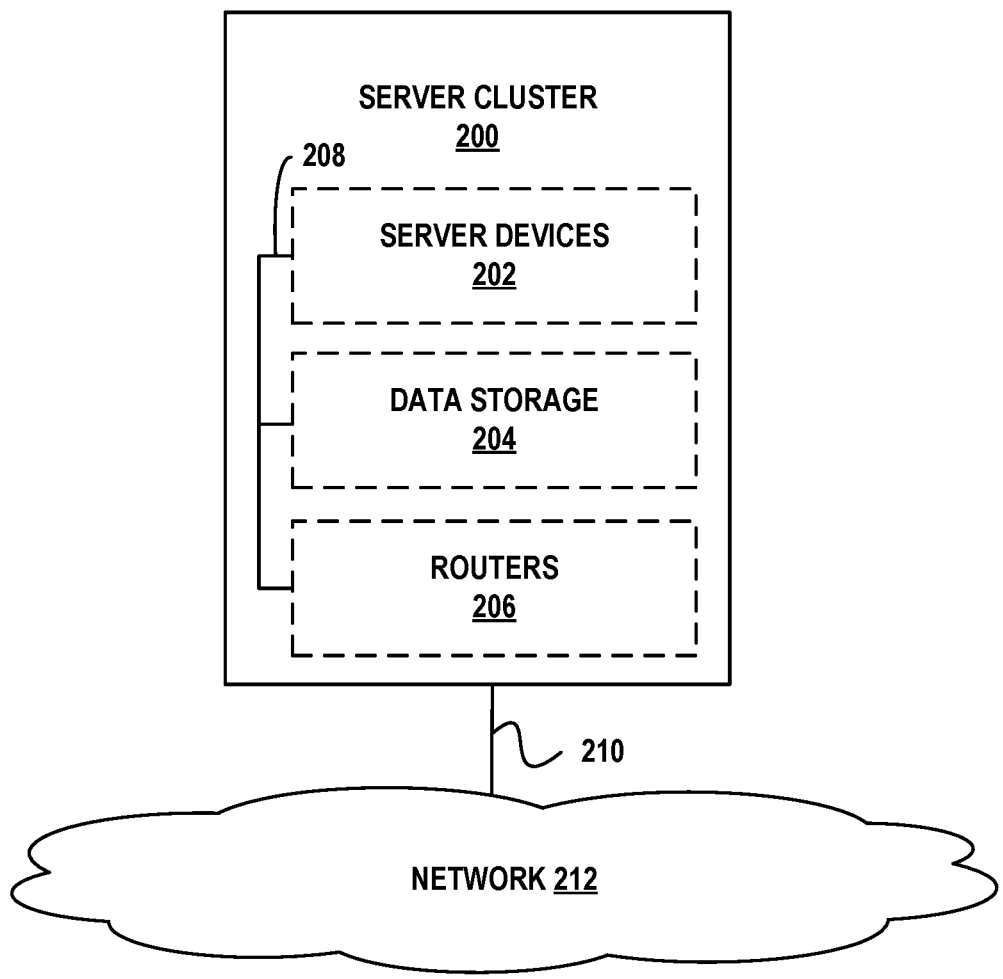
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between the server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JavaScript, and so on. Computer program code written in these languages may facilitate the providing of web pages to client devices, as well as client device interaction with the web pages.

III. EXAMPLE REMOTE NETWORK MANAGEMENT ARCHITECTURE

Figure 3:
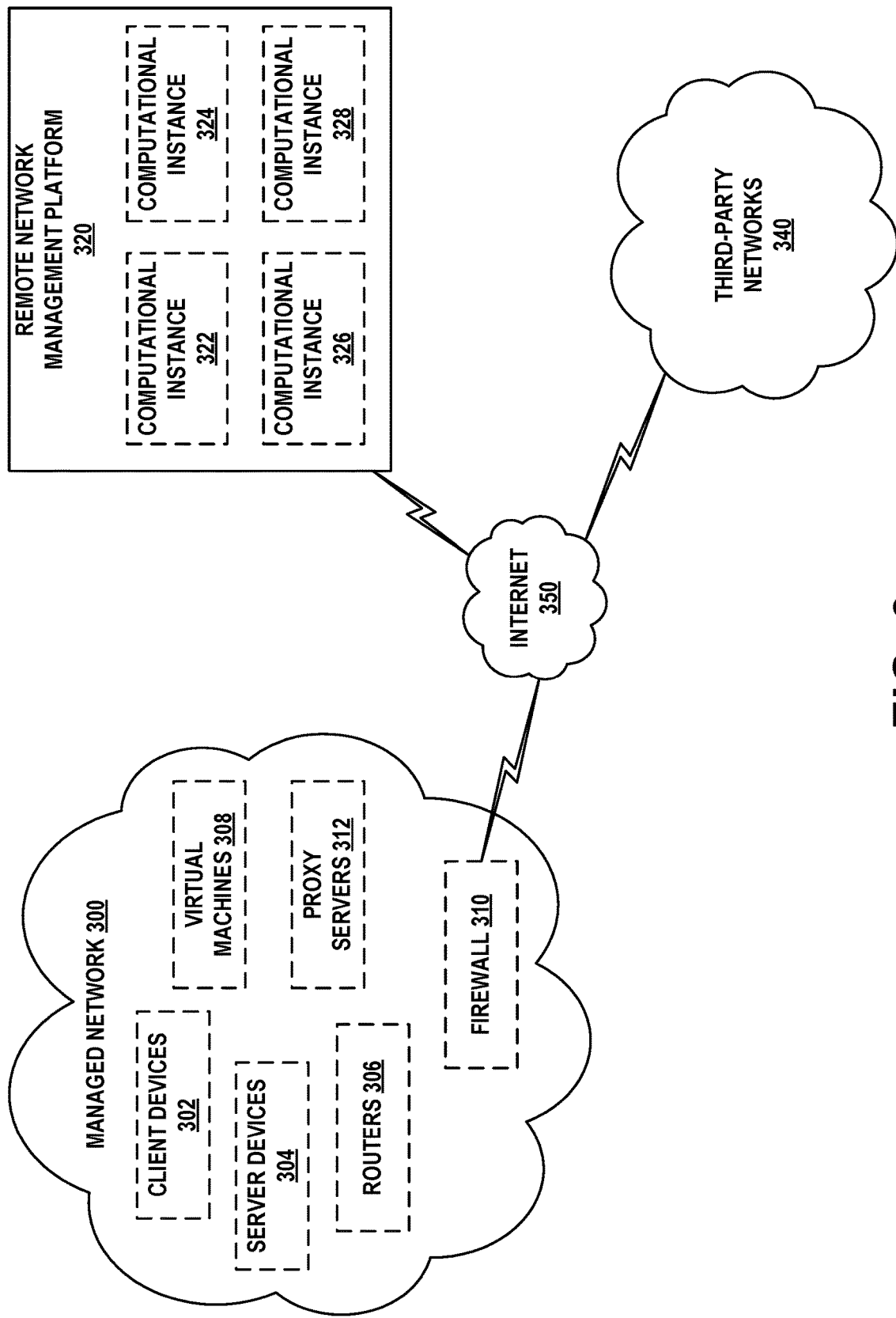
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by an entity for computing and communications tasks, as well as storage of data. Thus, managed network 300 may include various client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these instances may represent a set of web portals, services, and applications (e.g., a wholly-functioning aPaaS system) available to a particular customer. In some cases, a single customer may use multiple computational instances. For example, managed network 300 may be an enterprise customer of remote network management platform 320, and may use computational instances 322, 324, and 326. The reason for providing multiple instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation.

The multi-instance architecture of remote network management platform 320 is in contrast to conventional multi-tenant architectures, over which multi-instance architectures have several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In order to support multiple computational instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® Azure. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy applications and services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
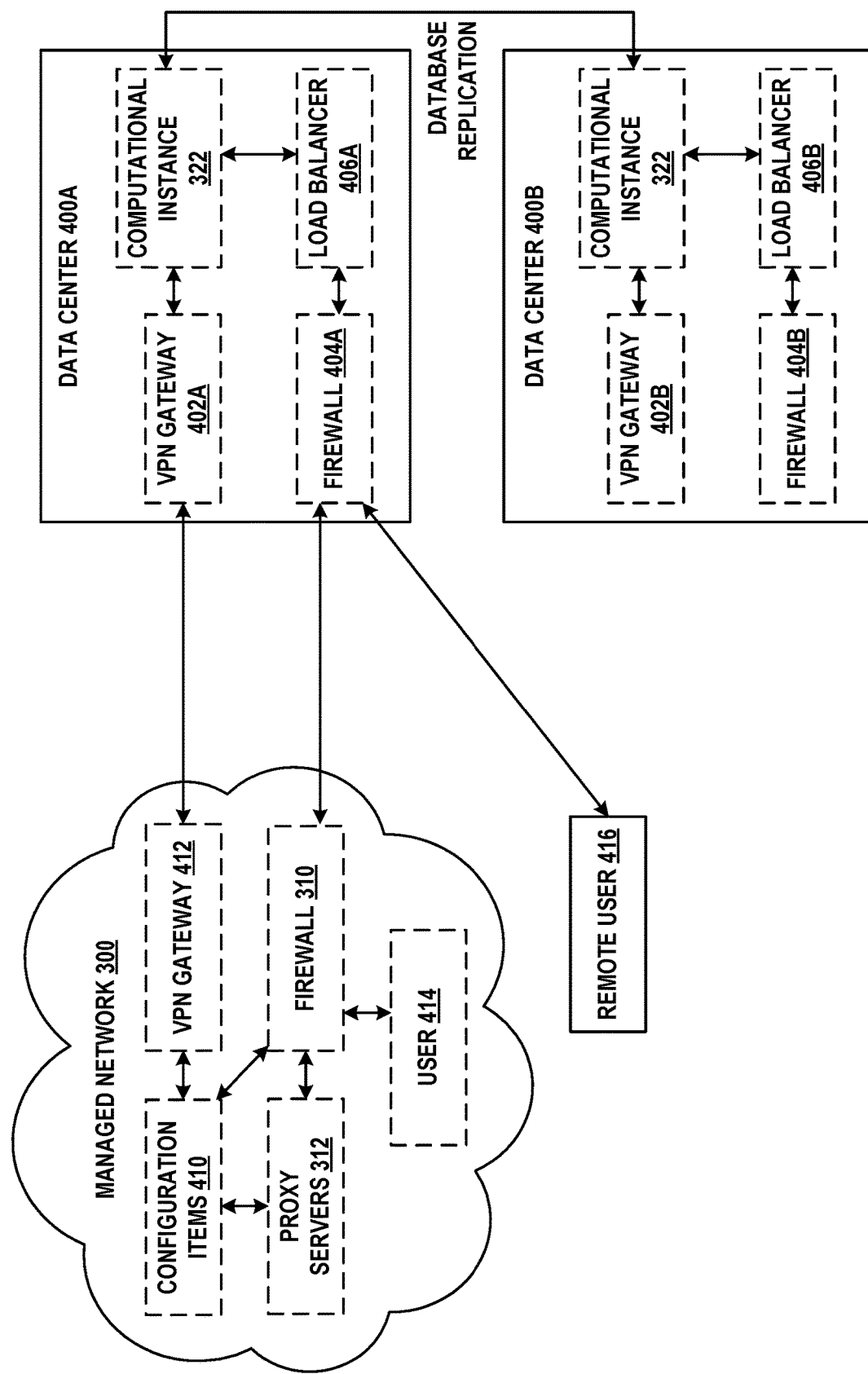
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. EXAMPLE DEVICE, APPLICATION, AND SERVICE DISCOVERY

In order for remote network management platform 320 to administer the devices, applications, and services of managed network 300, remote network management platform 320 may first determine what devices are present in managed network 300, the configurations and operational statuses of these devices, and the applications and services provided by the devices, and well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purpose of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
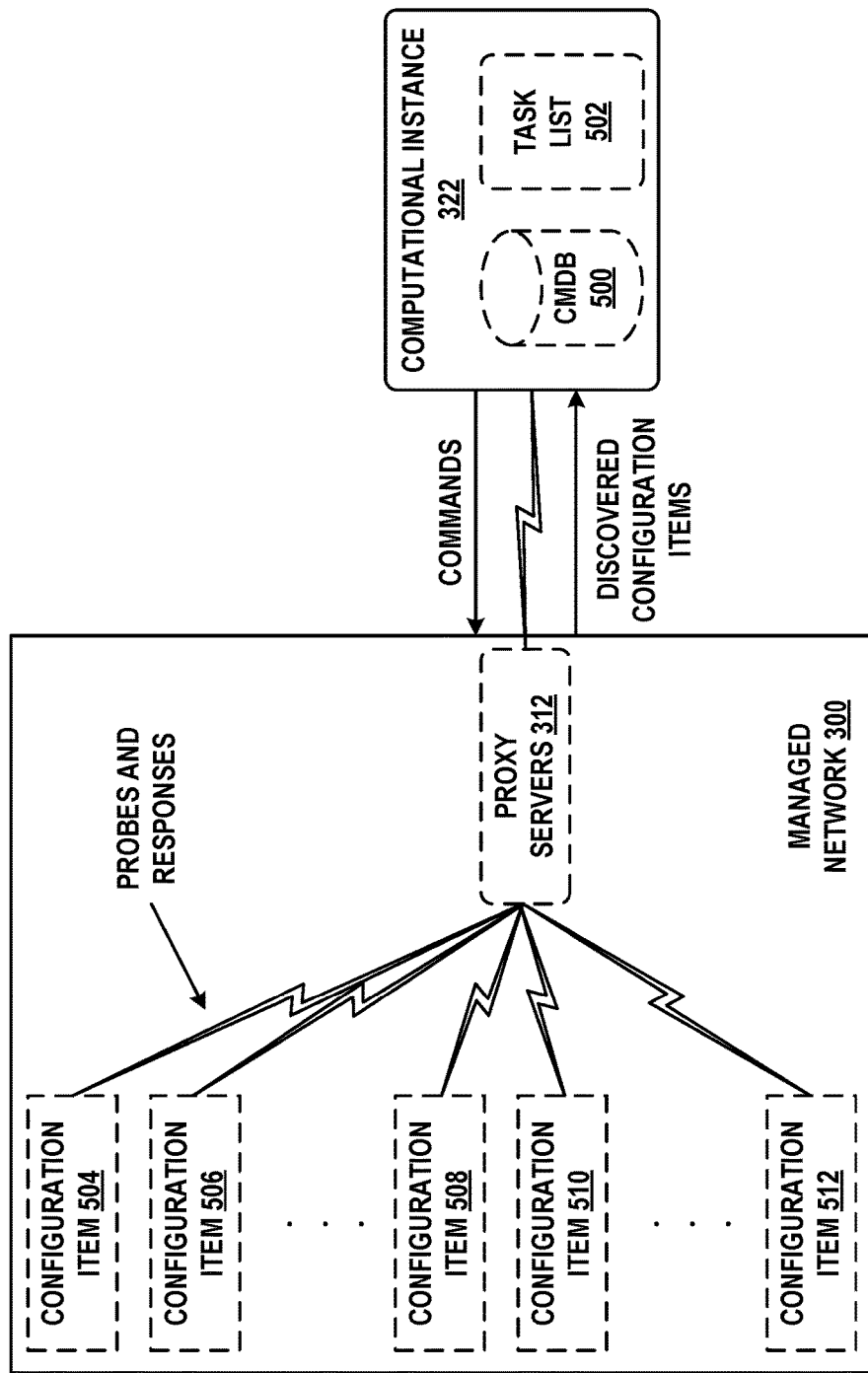
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address (es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
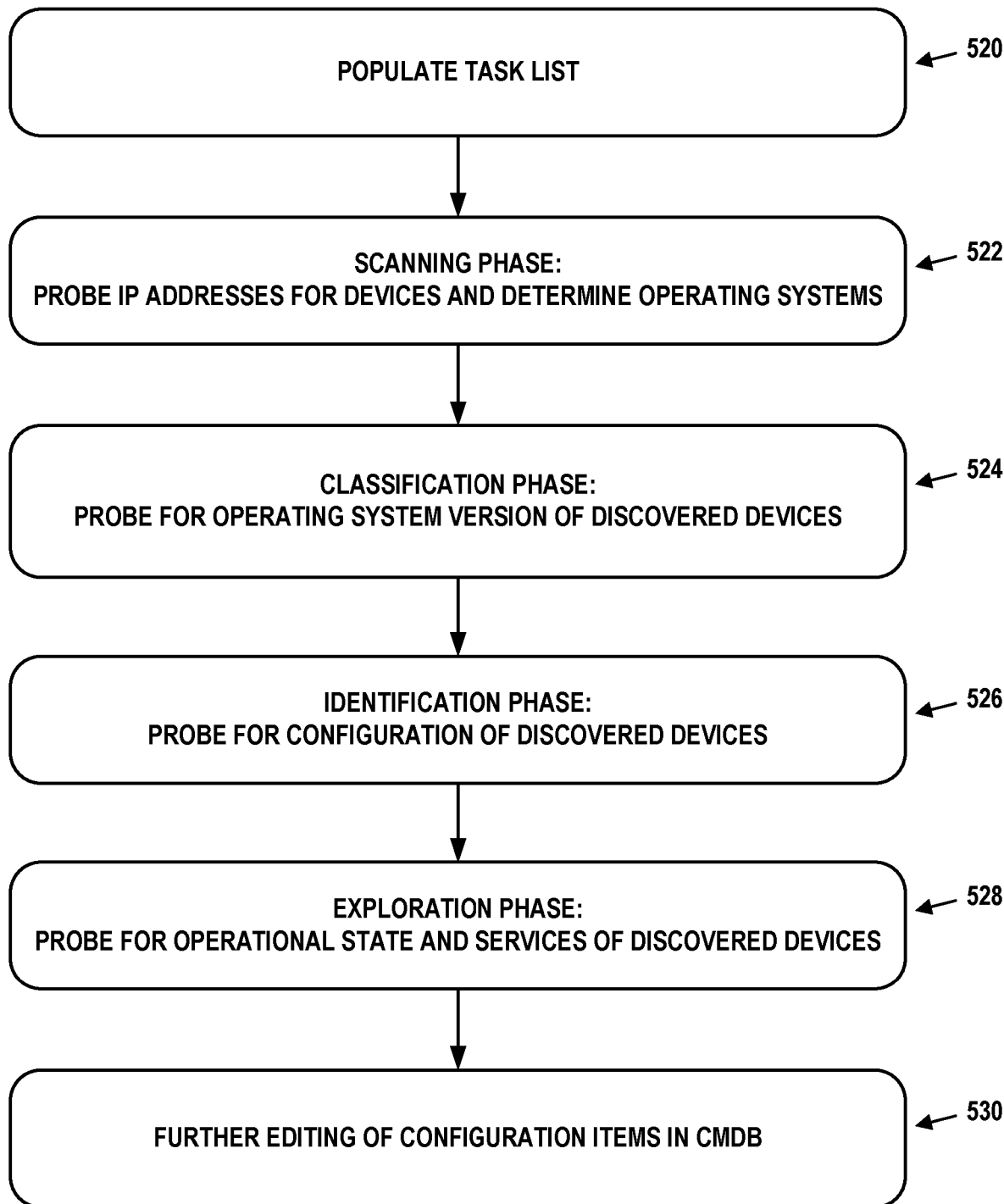
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. CMDB IDENTIFICATION RULES AND RECONCILIATION

A CMDB, such as CMDB 500, provides a repository of configuration items, and when properly provisioned, can take on a key role in higher-layer applications deployed within or involving a computational instance. These applications may relate to enterprise IT service management, operations management, asset management, configuration management, compliance, and so on.

For example, an IT service management application may use information in the CMDB to determine applications and services that may be impacted by a component (e.g., a server device) that has malfunctioned, crashed, or is heavily loaded. Likewise, an asset management application may use information in the CMDB to determine which hardware and/or software components are being used to support particular enterprise applications. As a consequence of the importance of the CMDB, it is desirable for the information stored therein to be accurate, consistent, and up to date.

A CMDB may be populated in various ways. As discussed above, a discovery procedure may automatically store information related to configuration items in the CMDB. However, a CMDB can also be populated, as a whole or in part, by manual entry, configuration files, and third-party data sources. Given that multiple data sources may be able to update the CMDB at any time, it is possible that one data source may overwrite entries of another data source. Also, two data sources may each create slightly different entries for the same configuration item, resulting in a CMDB containing duplicate data. When either of these occurrences takes place, they can cause the health and utility of the CMDB to be reduced.

In order to mitigate this situation, these data sources might not write configuration items directly to the CMDB. Instead, they may write to an identification and reconciliation application programming interface (API). This API may use a set of configurable identification rules that can be used to uniquely identify configuration items and determine whether and how they are written to the CMDB.

In general, an identification rule specifies a set of configuration item attributes that can be used for this unique identification. Identification rules may also have priorities so that rules with higher priorities are considered before rules with lower priorities. Additionally, a rule may be independent, in that the rule identifies configuration items independently of other configuration items. Alternatively, the rule may be dependent, in that the rule first uses a metadata rule to identify a dependent configuration item.

Metadata rules describe which other configuration items are contained within a particular configuration item, or the host on which a particular configuration item is deployed. For example, a network directory service configuration item may contain a domain controller configuration item, while a web server application configuration item may be hosted on a server device configuration item.

A goal of each identification rule is to use a combination of attributes that can unambiguously distinguish a configuration item from all other configuration items, and is expected not to change during the lifetime of the configuration item. Some possible attributes for an example server device may include serial number, location, operating system, operating system version, memory capacity, and so on. If a rule specifies attributes that do not uniquely identify the configuration item, then multiple components may be represented as the same configuration item in the CMDB. Also, if a rule specifies attributes that change for a particular configuration item, duplicate configuration items may be created.

Thus, when a data source provides information regarding a configuration item to the identification and reconciliation API, the API may attempt to match the information with one or more rules. If a match is found, the configuration item is written to the CMDB. If a match is not found, the configuration item may be held for further analysis.

Configuration item reconciliation procedures may be used to ensure that only authoritative data sources are allowed to overwrite configuration item data in the CMDB. This reconciliation may also be rules-based. For instance, a reconciliation rule may specify that a particular data source is authoritative for a particular configuration item type and set of attributes. Then, the identification and reconciliation API will only permit this authoritative data source to write to the particular configuration item, and writes from unauthorized data sources may be prevented. Thus, the authorized data source becomes the single source of truth regarding the particular configuration item. In some cases, an unauthorized data source may be allowed to write to a configuration item if it is creating the configuration item or the attributes to which it is writing are empty.

Additionally, multiple data sources may be authoritative for the same configuration item or attributes thereof. To avoid ambiguities, these data sources may be assigned precedences that are taken into account during the writing of configuration items. For example, a secondary authorized data source may be able to write to a configuration item's attribute until a primary authorized data source writes to this attribute. Afterward, further writes to the attribute by the secondary authorized data source may be prevented.

In some cases, duplicate configuration items may be automatically detected by reconciliation procedures or in another fashion. These configuration items may be flagged for manual de-duplication.

VI. EXAMPLE EXECUTING SOFTWARE PROCESS-BASED DISCOVERY

Discovery often involves exploring the contents (e.g., files, software products, etc.) of computing devices within managed network 300 according to predefined criteria. The predefined criteria may identify storage drives, folders, file types, or specific files to be searched for and/or scanned on one or more computing devices within managed network 300. For example, task list 502 may be populated with tasks determined based on the predefined criteria. Such an approach may work well for managed networks that are generally similar or uniform in their organization of computing devices, software products, and other discoverable configuration items. For example, when software products are consistently installed in a predefined set of file system directories, the software products may be quickly and easily discovered by searching the predefined set of file system directories.

However, in practice, different managed networks may have disparate conventions for organizing their discoverable configuration items. Accordingly, while a set of predefined discovery criteria may work well with a first managed network for which the criteria has been designed, the same set of predefined discovery criteria might not work well with a second managed network that organizes its discoverable configuration items according to different rules or conventions. Notably, such differences in organization of discoverable configuration items may be due to (i) differences in operating systems and their corresponding file system structures as well as (ii) differences in how different managed networks chose to organize or utilize the file system structures provided by a given operating system, among other possibilities.

As the size and number of managed networks scales, it may be difficult, inefficient, or infeasible to define predetermined discovery criteria for the different possible arrangements and organizational structures of discoverable configuration items within the managed networks. Accordingly, disclosed herein are discovery operations that involve planning the discovery based on software processes that are executing on the computing devices within a managed network. Specifically, the discovery operations may be based on file system directories that are associated with each executing software process. Thus, rather than predefining discovery criteria or performing discovery on the entire file system, discovery may be focused on the portions of the file system that are associated with or correspond to or currently executing software products. Such discovery may be referred to herein as automated discovery or process-based discovery.

A software process ("process," for short) may be an occurrence of or a particular execution of a software product. For example, the software product may be word processing software. Multiple occurrences of the word processing software may be simultaneously executing (i.e., running) within a given time window, with each occurrence representing or correspond to one process. A first occurrence of the word processing software, corresponding to a first process, may, for example, have a first file opened therein while a second occurrence, corresponding to a second process, may have a second file opened therein. Each process may be further subdivided into subunits called threads, which may be executed in parallel by multiple processors of a computing device.

Figure 6:
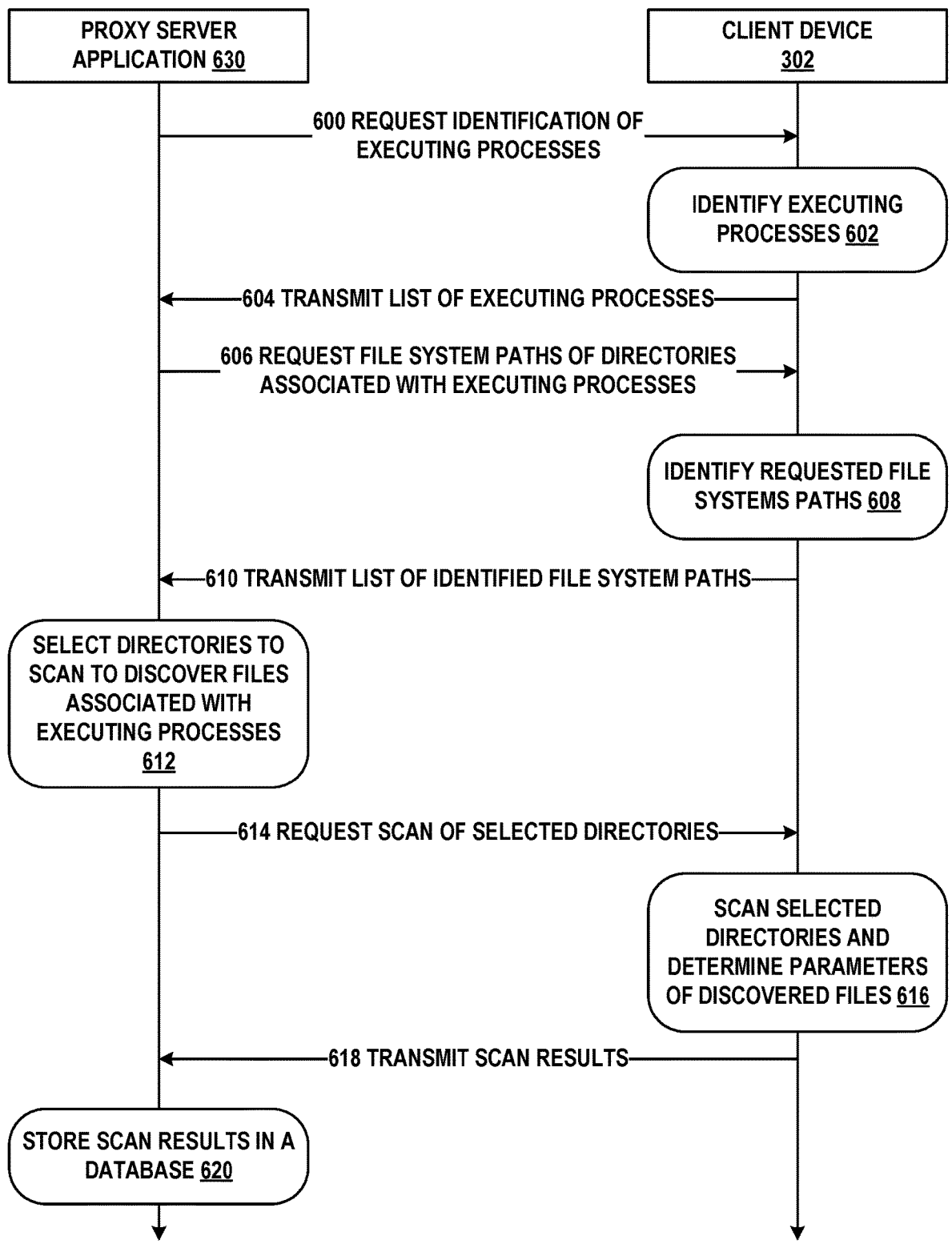
FIG. 6 is a message flow diagram, in accordance with example embodiments.

FIG. 6 illustrates a message flow diagram between proxy server application 630 and client device 302 within managed network 300. Proxy server application 630 may be disposed on proxy server 312 within managed network 300 or on a computational instance (e.g., computational instance 322) within remote network management platform 320. This arrangement may be referred to as agentless discovery. Alternatively, proxy server application 630 or a related software application may be disposed on client device 302 within managed network 300. This approach, on the other hand, may be referred to as agent-based discovery. Additionally, in some implementations, the operations shown as being performed by proxy server application 630 may alternatively be performed by client device 302, computational instance 322, or other software applications, and vice versa.

Process-based discovery may involve proxy server application 630 transmitting to client device 302 a request to identify processes executing on client device 302, as indicated by arrow 600. This request may include instructions invoking an operating system or operating system shell function configured to cause the operating system to provide information regarding any processes currently executing on client device 302. The instructions at arrow 600 (as well as those at arrows 606 and 614) may be operating system-specific or operating system shell-specific, and may be generated by proxy server application 630 based on configuration items discovered at, for example, block 524 of FIG. 5B. In response to or based on reception of the request to identify processes executing on client device 302, client device 302 may be configured to execute the instructions contained in the request, thus identifying any processes executing thereon, as indicated by block 602.

Based on or in response to identifying the executing processes at block 602, client device may also be configured to transmit a list of the identified executing processed to proxy server application 630, as indicated by arrow 604. The list may include, among other data generated at block 602, a process identifier (PID), a user account from or by which the process was initiated, a start time of the process, and/or a command used to invoke the process. The data associated with each process may vary with the operating system executed by client device 302 and the content of the request provided at arrow 600, among other factors. Namely, each operating system may provide a different default set of data associated with each process. The default data set may be modifiable to include more or less information about each process by including different parameters (e.g., flags) in the request at arrow 600.

In response to or based on receiving the list of executing processes, proxy server application 630 may be configured to transmit to client device 302 a request for file system paths of directories associated with the executing processes, as indicated by arrow 606. Similarly to arrow 600, the request indicated by arrow 606 may include instructions invoking an operating system or operating system shell function configured to cause the operating system to generate and provide the requested data. The request at arrow 606 may include instructions to identify the file system paths for all the executing software processes or a subset thereof. For example, when multiple processes corresponding to one software product are being executed, the file system path for only one of the processes may be requested as the other processes may be expected to return the same file system path. In another example, file system paths for user-space processes, but not operating system processes, may be requested.

In response to or based on receiving the request at arrow 606, client device 302 may be configured to execute the instructions contained therein and identify the requested file system paths, as indicated by block 608. The operating system of client device 302 may be configured to keep track of the file system paths corresponding to the executing processes by, for example, storing data representing or identifying (i) a directory where an executable file corresponding to the executing process is stored, (ii) directories in which the executing process opened files during its execution, and/or (iii) directories in which files linked to the executable file are stored, among other directories associated with the process. In some embodiments, the operating system may store some of the information related to file system paths of executing processes in environmental variables or in registries. In response to or based on identifying the requested file paths at block 608, client device 302 may be configured to transmit, to proxy server application 630, a list of the identified file system paths corresponding to the processes identified at arrow 606.

Notably, in some implementations, the requests at arrows 600 and 606 may be merged together. That is, proxy server application 630 may be configured to transmit one request that instructs client device 302 to identify its executing process and provide the file system path for each executing process. Accordingly, the operations of blocks 602 and 608, as well as the transmissions represented by arrows 604 and 610, may be merged as well.

In response to or based on receiving the transmission at arrow 610, proxy server application 630 may be configured to select directories to scan to discover files associated with the executing processes, as indicated by block 612. The selected directories may include (i) a first directory in which an executable file corresponding to an executing process is located, (ii) a parent directory of the first directory, (iii) a sub-directory (i.e., child directory) of the first directory, (iv) one or more second directories from which the executing process accesses one or more files, (v) one or more parent directories of the one or more second directories, (vi) one or more sub-directories of the one or more second directories, (vii) one or more third directories containing files linked to the executing process or its executable file, (viii) one or more parent directories of the one or more third directories, and/or (ix) one or more sub-directories of the one or more third directories, among other possible directories.

In other words, the directories selected to be scanned for files associated with the executing process may include any directories that the executing process uses, accesses, or otherwise interacts with, any directories that contain files otherwise related to the executing process, and/or any parents and children of such directories. Accordingly, any files related to the executing process may be discovered.

In response to or based on selecting the directories at block 612, proxy server application 630 may transmit to client device 302 a request to scan or explore the selected directories for files associated with the executing processes, as indicated by arrow 614. The request may include instructions configured to, for example, cause an operating system shell of client device 302 to access each selected directory, identify the files located therein, and, for each file, determine the requested attributes. The attributes may include a file name, a file size, read-write-access privileges for the file, an owner of the file, and a checksum of the file, among other possible attributes. The attributes may be determined by utilizing one or more shell commands or scripts available on client device 302.

Based on or in response to scanning for files and determining the attributes thereof at block 616, client device 302 may transmit results of the scanning to proxy server application 630, as indicated by arrow 618. The scan results may include the identified files, their respective file system locations, and the attributes corresponding to each file. The scan results may be transmitted (i) sequentially, as each file is discovered and its attributes are determined, (ii) in larger batches, after groups of files in the selected directories are discovered and their attributes have been determined, or (iii) periodically at predetermined time points.

Based on or in response to reception of the scan results at arrow 618, proxy server application 630 may be configured to store the scan results in a database, as indicated by block 620. In some implementations, all or a portion of the scan results may be stored in the database without additional processing. Alternatively, the received scan results may be processed by proxy server application 630 before being stored. For example, proxy server application 630 may filter the scan results to remove some results (e.g., ignore certain file types, ignore files with insufficient attributes associated therewith, ignore some attributes, etc.).

In another example, proxy server application 630 may be configured to compute a hash value of the determined file attributes, allowing for a smaller amount of data to be used to represent each file. A hash value ("hash" for short) may be data of a fixed size determined by mathematically mapping (i.e., by way of a hash function) the file attributes, which may have a variable length, to the data of the fixed size. The hash may be a cryptographic hash computed by way of a one-way cryptographic hash function (e.g., secure hash algorithm 256 (SHA-256)) that maps the file attributes to a fixed-length sequence. A one-way hash function, which may also be referred to as a message digest or a fingerprint function, is designed in a way that makes it difficult to reverse the hashing process. Thus, once an input is hashed, it is very difficult (i.e., nearly impossible in practice) to determine the input (e.g., the file attributes) that produced the hash. Further, a good one-way hash function also makes it difficult to find two different inputs that would produce the same hash value.

Remote network management platform 320 may include a signature database containing hash values (e.g., cryptographic signatures) for a plurality of different software products and their associated files. The computed hash of a file contained in the search results may thus be used to determine a software product to which the file corresponds by referencing the signature database.

In cases where the computed hash of the file contained in the search results does not match any signatures in the database, the file may be identified as a file to be added to the signature database and/or as a potential threat. Accordingly, the computed hash and/or the attributes of the file may be referenced against a database of security threats. If the file is determined not to be a security threat, the hash of the file may be added to the signature database along with additional information, such as a mapping between the file and a software product, to allow subsequent discoveries of similar files on other computing devices to be mapped to the software product.

Additionally, the scan results may also be processed in other ways to identify relationships between the discovered files, software products, and computing devices, among other resources. The processed and/or unprocessed scan results may be stored in the database as configuration items that describe a state of the managed network containing client device 302.

VII. EXAMPLE INSTRUCTIONS FOR SOFTWARE PROCESS-BASED DISCOVERY

FIGS. 7A, 7B, 7C, and 7D illustrate example instructions that may be provided to client device 302 to carry out some of the operations illustrated in FIG. 6. The instructions are provided to client device 302 (i.e., computing_device_1) by way of an operating system shell (i.e., an interface configured to allow access to an operating system's services). Notably, the instructions shown in FIGS. 7A-7D correspond to an operating system shell of a UNIX® or a UNIX®-like operating system (e.g., LINUX®). Different operating system-specific instructions may be used to perform similar operations on different operating systems such as, for example, WINDOWS® or MACOS®. The prompt "proxy_app@computing_device_1" on line 700 indicates that client device 302 is being remotely accessed by way of proxy server application 630 (i.e., proxy_app). Although a graphical representation of the input and output of the operating system shell is shown in FIGS. 7A-7D for illustrative purposes, such graphical representations might not be displayed in practice. Rather, the information shown graphically may be transmitted between client device 302 and proxy server application 630 by way of a network connection.

Line 700 of FIG. 7A indicates that proxy server application 630 provided instruction or command "ps" to client device 302. The "ps" instruction is configured to cause the operating system shell to report a snapshot of processes currently executing on a computing device. Accordingly, in response to the "ps" instruction, client device 302 is configured to generate an output at lines 701, 702, 703, 704, 705, 706, and 707 (i.e., lines 701-707) containing a list of processes currently executing on client device 302. The output may include, for each executing process, (i) the PID of the process, (ii) a user account under which the process is executing, (iii) a time at which execution of the process was initiated, and (iv) a command used to initiate execution of the process (e.g., the name of the executable file along with any provided parameters). Notably, the "ps" command may be modified with various flags to control the content of the output at lines 701-707, thereby causing client device 302 to provide more or less information than shown in FIG. 7A. The list of identified processes, along with any data corresponding to each process, may be transmitted from client device 302 to proxy server application 630.

FIG. 7B illustrates the "pwdx" instruction ("pwd" being short for "print working directory") being used at line 708 to identify a directory associated with the process having PID=3, as identified in FIG. 7A. In response to receiving the instruction "pwdx 3" from proxy server application 630, the operating system shell of client device 302 may be configured to provide an indication of a directory in which one or more files of a software product (e.g., an executable file thereof) corresponding to process having PID=3 are stored. Accordingly, line 709 shows "/usr/bin" identified as the directory in which files for the software product corresponding to the process with PID=3 are stored. In the example shown, in response to or based on identification of the "/usr/bin" directory, proxy server application 630 selects the "/usr/bin" directory, rather than, for example, the "/usr" directory, to be scanned for files associated with the process. However, in other cases, proxy server application 630 may select the "/usr" directory or subdirectories of "/usr/bin" as well or instead. Notably, the example "/usr/bin" directory is a standard directory on a UNIX® or UNIX®-like operating systems that contains executable files. However, the operations described herein apply equally to other standard and non-standard directories on any operating system.

Line 710 shows instruction "cd," short for "change directory," being used to change a working directory in which proxy server application 630 is executing instructions. Namely, the working directory is changed to "/usr/bin," the directory selected to be scanned for files related to the process with PID=3. Line 711 shows instruction "ls" being used to list the files stored in the working directory (i.e., "/usr/bin" directory) as part of scanning for files associated with process having PID=3. In response to receiving the "ls" instruction as input, the operating system shell of client device 302 may be configured to generate a list of files stored in the "/usr/bin" directory (i.e., in the directory in which the "ls" instruction is executed).

Lines 712 and 713 show a list of files stored in the "/usr/bin" directory. Namely, files in the "/usr/bin" directory include "program_1," "program_2," "program_3," "program_4," "program_5," "program_6," "program_7," "program_8," and "file_2." One or more of these files may be associated with the process having PID=3. In the example shown, "program_1" corresponds to (i.e., is the executable of) the process having PID=3. However, this relationship might not be known at the time of scanning this directory for files. Notably, once a relevant directory is selected for scanning, the relationship between the files therein and the process used to select the directory might not need to be determined. The discovered files may, however, be mapped to corresponding software products and their processes by using hash values, as previously described.

Line 713 additionally indicates that the "/usr/bin" directory contains sub-directories (i.e., child directories) "program_20_directory" and "program_30_directory." Notably, in the example at hand, the process with PID=3 corresponds to program_1 stored in "/usr/bin," rather than program_20 stored in program_20_directory or program_30 stored in program_30_directory. However, since this relationship might not be known at the time of scanning, program_20_directory and program_30_directory may, in some implementations, also be scanned for files associated with the process having PID=3. In some cases, program_30_directory and program_2_directory might be scanned regardless of whether the files therein are expected to be associated with the process having PID=3 since other files of interest may nevertheless be found in these directories. In alternative implementations, "/usr/bin" may be scanned for files, but its sub-directories might not be scanned.

FIG. 7C illustrates the scanning process being carried out for another executing process. Namely, for process with PID=4, the "pwdx" command may cause client device 302 to indicate "usr/bin/program_20_directory" as the working directory of the process, as indicated by lines 714 and 715. Notably, the working directory of the process with PID=4 is different from that of the process with PID=3. Proxy server application 630 may provide instruction "cd/usr/bin/program_20_directory," as indicated by line 716, to cause client device 302 to change the working directory to "/usr/bin/program_20_directory" and execute subsequent instructions therein. Executing instruction "ls" in the "/usr/bin/program_20_directory," as indicated by line 717, may cause client device 302 to list the files contained therein. Lines 718 and 719 indicate that the "/usr/bin/program_20_directory" contains files "program_20_file_1," "program_20_file_2," "program_20_file_3," "program_20_file_4," "program_20_file_5," "program_20_file_6." Client device 302 may determine the plurality of attributes for each of these files and subsequently transmit this information to proxy server application 630.

Notably, the directory "/usr/bin/program_20_directory" is a sub-directory of "usr/bin." If the directory "/usr/bin/program_20_directory" has already been scanned while the "/usr/bin" directory was being scanned, the "/usr/bin/program_20_directory" directory might not need to be rescanned. Alternatively, the "/usr/bin/program_20_directory" may be rescanned if more than a threshold amount of time has elapsed since a most recent scan thereof. Additionally, FIGS. 7A, 7B, and 7C imply that directories for one process are identified and scanned before directories for another process are identified and scanned. However, in some implementations, all the directories to be scanned for any executing processes may be identified before a scan takes place. Thus, where multiple processes share one directory or sub-directory, the directory or sub-directory might only be scanned once.

FIG. 7D illustrates an alternative instruction for identifying directories associated with executing processes. Namely, the instruction "lsof," short for "list open files" may be used to determine files that have been and remain opened by a particular process. Specifically, the instruction lsof may be passed the flag "-p" and parameter "1150," indicating to list open files associated with the process having PID=1150. In response to the instruction "lsof-p 1150" passed at line 720, the operating system shell of client device 302 may be configured to list any files, along with their corresponding directories, that are currently opened by process having PID=1150. Thus, lines 721, 722, 723, 724, and 725 indicate that the process with PID=1150 has opened "file_1" stored in directory "/bin," "library_function_1" stored in directory "/lib," "file_2" stored in directory "/usr/bin," "file_3" stored in directory "/usr/program_30_directory," and "file_4" stored in directory "/usr/program_30_directory," respectively.

Each of the directories identified by the "lsof" instruction and, in some implementations, any sub-directories therein, may be selected by proxy server application 630 for scanning by client device 302. Scanning the directories in which the identified files are stored, rather than only relying on the "lsof" command to identify files associated with a given process, may reveal additional files that, although not currently opened, might be accessed by the process at other times.

The "pwdx PID" instructions and the "lsof-p PID" instructions may be used independently or in combination to identify directories and/or files associated with a particular process. For example, in some implementations, the "lsof" instruction (or the equivalent thereof on another operating system) might not be configured to list the executable file that starts execution of a given process as one of the files currently opened by the given process. The "pwdx" instruction (or the equivalent thereof on another operating system) may compensate for this by determining the working directory of the process in which the executable file is likely to be stored. Thus, using both instructions in combination may identify a greater number of directories to scan for files associated with a given process. Additionally, other operating system shell instructions (e.g., "ls-1 file," where file is a symbolic link), combinations thereof, and variations thereof not discussed herein may be used to identify file system directories associated with an executing process.

In some implementations, proxy server application 630 and/or client device 302 may be configured to store a log file that identifies the directories to be scanned for a particular process or software product corresponding thereto. For example, an initial discovery process may be carried out, as described above, which may generate a log file that associates any executing software products with corresponding scanned directories. For example, the log file may identify directories that have been scanned in association with "program_30." During a subsequent round of discovery carried out at a later time after the initial discovery process has been completed, another process corresponding to "program_30" may be discovered executing on client device 302. Before selecting directories to be scanned for the process corresponding to "program_30," the log file may be checked to determine whether any directories have been previously determined for "program_30." If the log file identifies directories to be scanned for "program_30," the directories identified therein may be selected for scanning, without repeating the directory selection process. In some implementation, when the log file identifies directories to scan for "program_30," proxy server application 630 also might not request that client device 302 identify the file system directories associated with the process corresponding to "program_30."

Alternatively, in some cases, proxy server application 630 may request that client device 302 identify directories associated with a process regardless of the contents of the log file. Proxy server application 630 may the select for scanning (i) directories indicated by the log file, (ii) other directories identified by client device 302 but not yet stored in the log file, or (iii) combinations thereof. Such an approach may be useful where the set of files used by a process is expected to change over time, thereby allowing for a more thorough scan with each additional round of discovery. The log file may be updated to store therein any newly-identified directories for a given software product, thus allowing subsequent scans to cover a larger set of relevant directories. The log file may also be updated to remove therefrom directories that are no longer associated with a given software product, thereby allowing discovery to omit directories unlikely to contain files related to the software product.

In some embodiments, the log file generated for one computing device may be used to guide discovery carried out on another computing device within the same managed network. Using a shared log file across multiple computing devices may allow for a faster software process-based discovery because certain file system directories of a computing device may be scanned for files even when a process corresponding thereto is not executing at the time of discovery on the computing device.

VIII. EXAMPLE APPLICATIONS OF EXECUTING SOFTWARE PROCESS-BASED DISCOVERY

Figure 8A:
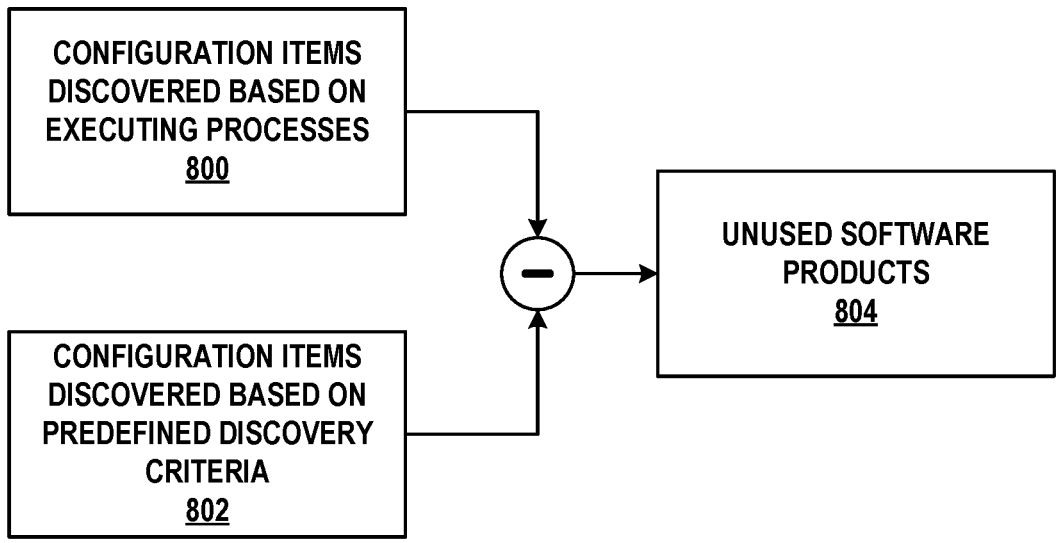
FIG. 8A depicts a system for identifying unused software products, in accordance with example embodiments.

While software process-based discovery operations may, in some cases, be used instead of predefined criteria-based discovery operations to facilitate and speed up discovery, the two may also be used in combination. For example, FIG. 8A illustrates software process-based discovery used in combination with predefined criteria-based discovery to assist with software asset management (SAM) by identifying unused software products. Namely, FIG. 8A illustrates a block diagram of a system, which may be implemented in software or hardware as part of proxy server application 630, client device 302, or remote network management platform 320.

Software process-based discovery may be used to discover a first plurality of configuration items based on executing processes, as indicated by block 800 and described above. Similarly, predefined criteria-based discovery may be used to discover a second plurality of configuration items based on predefined discovery criteria, as indicated by block 802. Since software process-based discovery is based on executing processes, unused software products that are not executed, and thus do not generate executing processes, might be undiscovered by process-based discovery. Notably, in order to determine the first plurality of configuration items, the operations of block 800 may be carried out repeatedly at different points in time to identify as many used software products as possible, thus reducing or minimizing the probability of not discovering a software product (e.g., due to the software product executing for short period of time). On the other hand, predefined criteria-based discovery may, in some cases, scan file system directories corresponding to unused software products. Thus, predefined criteria-based discovery may find files corresponding to software products that would otherwise not be scanned by process-based discovery due to the software products being unused by the computing device on which discovery is carried out.

Accordingly, by taking the difference between the first plurality of configuration items identified at block 800 and the second plurality of configuration items identified at block 802, unused software products may be identified, as indicated by block 804. The difference may indicate (i) an absence of files corresponding to a software product in the first plurality of configuration items that are present in the second plurality of configuration items and/or (ii) an absence of relationships between the software product and other discovered configuration items. Based on identifying the unused software products, the unused software products may be removed from the corresponding computing device, thus freeing up software licenses (resulting in lower costs to the managed network) and computing resources.

Notably, the predefined criteria-based discovery operations may take a longer amount of time to execute as a result of scanning a larger number of directories than software process-based operations. Namely, software process-based discovery operations use executing processes to target selected directories likely to have files of interest, while predefined criteria-based discovery operations may search a larger number of directories in a less targeted manner (e.g., by traversing entire directory tree structures), with only some of the searched directories having files of interest. Accordingly, software process-based discovery may be repeated with a higher frequency than predefined criteria-based discovery while using the same or smaller amount of computing resources.

For example, one round of software process-based discovery may be carried out in under a minute or several minutes. On the other hand, one round of predefined criteria-based discovery may take tens, hundreds, or thousands of minutes to scan an entire file system. Additionally, a complex file system hierarchy might cause predefined criteria-based discovery to take a longer time to execute than a simple file system hierarchy. On the other hand, the execution time of process-based discovery might be largely unaffected by the complexity of a file system hierarchy.

Additionally, by repeating process-based discovery more frequently, the probability of discovering a larger number of software products is increased. That is, a software product that might not have been executing at a first time may be discovered at a second later time, with the likelihood of discovery increasing as the time interval between successive process-based scans decreases. To that end, proxy server application 630 may be configured to execute software-process based discovery at a predetermined frequency (e.g., every hour). However, proxy server application 630 may additionally or alternatively be configured to execute software-process based discovery at random times or in response to the operating system of client device 302 launching a new process, thereby increasing the probability of discovering a large number of software products and files on client device 302 by diversifying the time points at which scanning takes place.

Launching of a new process may be detected, for example, by a software application disposed on client device 302 and configured to periodically poll the operating system for a list of process (e.g., using the "ps" function). The software application may compare the output generated by the operating system shell over time in response to the "ps" command. When the output changes to indicate that one or more new processes have started executing, the software application may transmit a request to proxy server application 630 to perform software process-based discovery. As a result, processes that might otherwise be missed due to discovery occurring while these processes are not executing may nevertheless be detected and their corresponding directories scanned.

The frequency, amount, or extent of discovery operations carried out by proxy server application 630 may be based on a number of conducted scans and/or an amount or number of configuration items discovered on client device 302, among other factors. For example, the initial 1-5 scans of client device 302 may be separated by a shorter time interval than subsequent scans since the subsequent scans may be expected to uncover fewer additional configuration items than the initial 1-5 scans. In another example, the frequency of process-based discovery may be decreased in proportion to the number of configuration items discovered, with discovery becoming less frequent as the number of discovered configuration items increases.

Figure 8B:
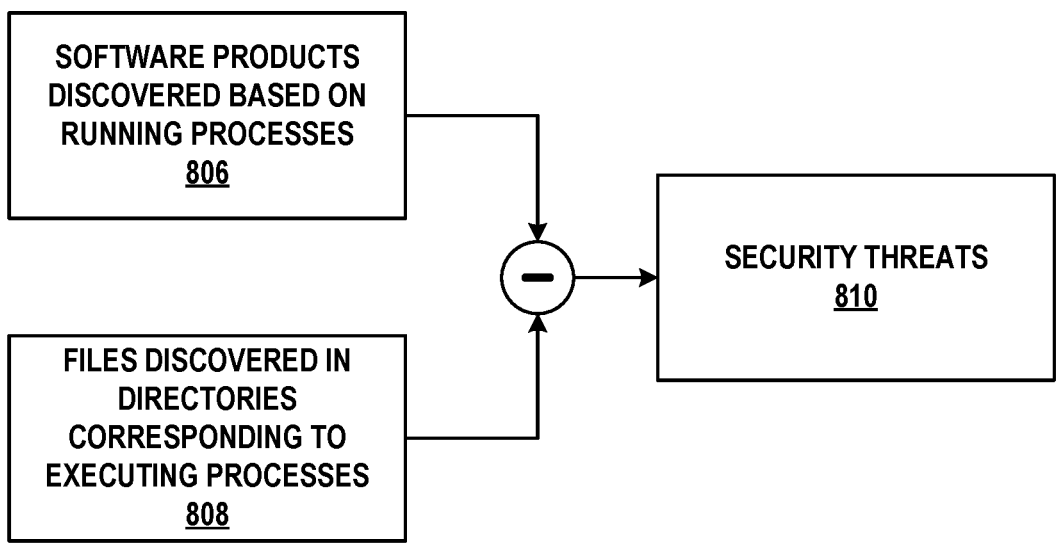
FIG. 8B depicts a system for identifying security threats, in accordance with example embodiments.

FIG. 8B illustrates a block diagram of a system to assist with identifying potential security threats. Namely, software process-based discovery may be used to identify executing software products discovered based on executing processes, as indicated by block 806. In many cases, a software product to which a process corresponds may be identified based on a name of the process, a command used to initiate execution of the process, a hash of the executable of the process, or other attributes provided by the operating system shell when identifying executing processes.

Software process-based discovery may also be used, as discussed above, to discover files stored in directories corresponding to the identified executing process, as indicated by block 808. Additionally, as indicated by block 810, potential security threats may be identified by comparing (e.g. determining the difference between) the executing software products identified at block 806 to the files identified in the corresponding directories at block 808. For example, one indicator of a security threat may include an absence of an executable file (or another type of file) from a working directory of an executing process, suggesting that the executing process is executing due to code injected into program memory and not due to execution of an executable file stored in non-volatile memory. Namely, the working directory of the executing process might not contain any executable files or might not contain any executable files whose attributes (e.g., name, size, etc.) correspond to the process based on which the directory was selected for scanning.

Another indicator of a security threat may include a profile of the files in the scanned directory not matching an expected profile corresponding to the executing process. For example, a process that appears to correspond to a web browser software product (e.g., based on a name or other attributes of the process) may be expected to have, in the corresponding working directory, an particular number of files, particular file types, particularly named files, and a particular organizational structure of sub-directories, among other characteristics. These characteristics, collectively referred to as a profile, may be known based on prior discovery of files related to the web browser software product on other computing devices. Accordingly, a deviation from the expected profile may indicate that the particular discovered process may have been modified and may thus contain malicious instructions. Flagging the executing process as a potential security threat may allow for the process and the files in the corresponding working directory to be reviewed in more detail by, for example, antivirus software.

IX. EXAMPLE OPERATIONS

Figure 9:
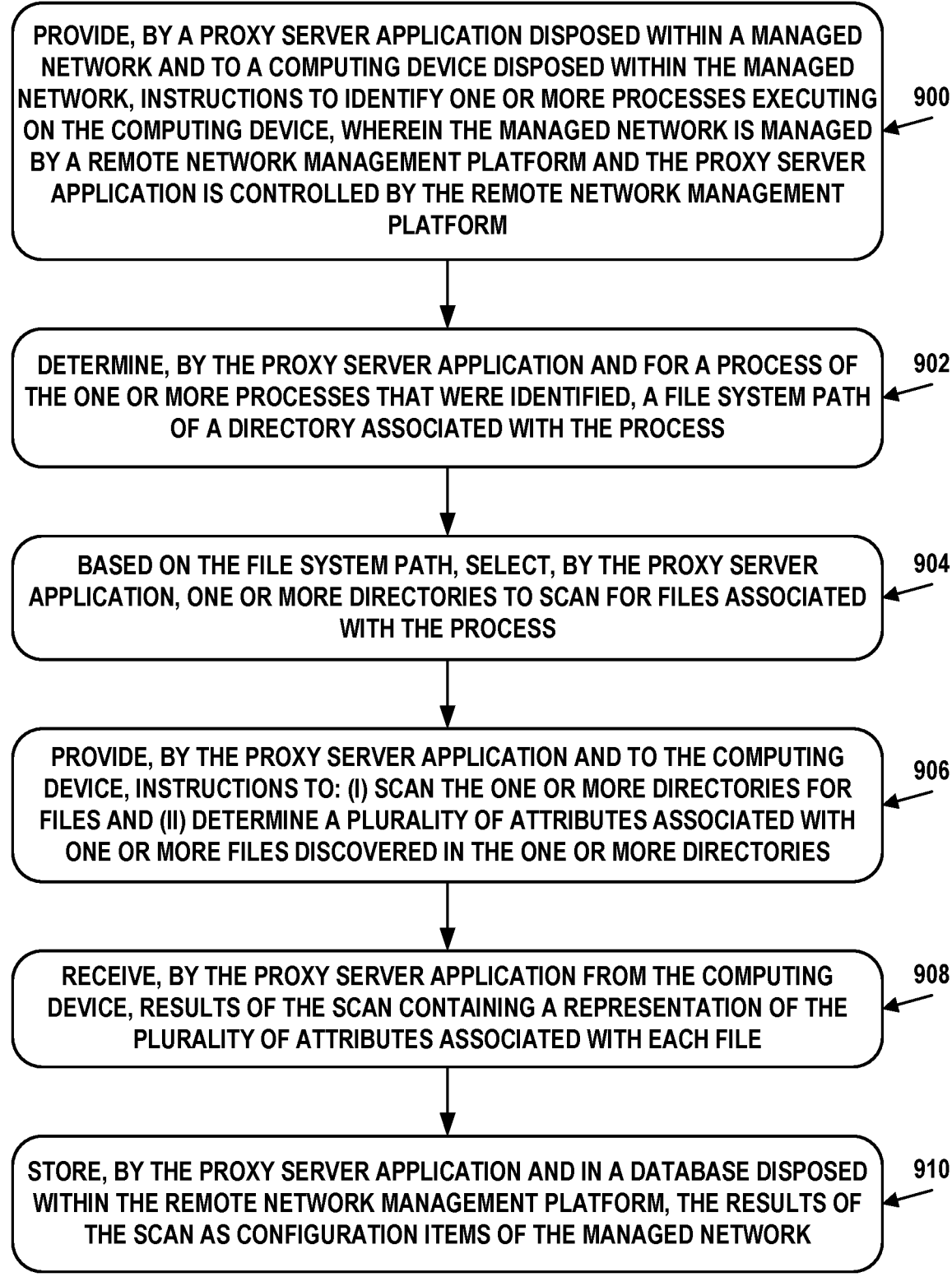
FIG. 9 is a flow chart, in accordance with example embodiments.

FIG. 9 is a flow chart illustrating an example embodiment. The process illustrated by FIG. 9 may be carried out by a computing device, such as computing device 100, and/or a cluster of computing devices, such as server cluster 200. However, the process can be carried out by other types of devices or device subsystems. For example, the process could be carried out by a portable computer, such as a laptop or a tablet device.

The embodiments of FIG. 9 may be simplified by the removal of any one or more of the features shown therein. Further, these embodiments may be combined with features, aspects, and/or implementations of any of the previous figures or otherwise described herein.

Block 900 involves providing, by a proxy server application disposed within a managed network and to a computing device disposed within the managed network, instructions to identify one or more processes executing on the computing device. The managed network is managed by a remote network management platform and the proxy server application is controlled by the remote network management platform.

Block 902 involves determining, by the proxy server application and for a process of the one or more processes that were identified, a file system path of a directory associated with the process.

Block 904 involves, based on the file system path, selecting, by the proxy server application, one or more directories to scan for files associated with the process.

Block 906 involves providing, by the proxy server application and to the computing device, instructions to: (i) scan the one or more directories for files and (ii) determine a plurality of attributes associated with one or more files discovered in the one or more directories.

Block 908 involves receiving, by the proxy server application from the computing device, results of the scan containing a representation of the plurality of attributes associated with each file.

Block 910 involves storing, by the proxy server application and in a database disposed within the remote network management platform, the results of the scan as configuration items of the managed network.

In some embodiments, selecting the one or more directories to scan for files associated with the process may include selecting the directory associated with the process as one of the one or more directories.

In some embodiments, selecting the one or more directories to scan for files associated with the process may include selecting a parent directory of the directory associated with the process as one of the one or more directories.

In some embodiments, determining the file system path of the directory associated with the process by may involve providing, to an operating system shell of the computing device, instructions configured to cause the operating system to provide the file system path of the directory associated with the process and receiving, from the computing device, an output of the operating system shell indicating the file system path of the directory associated with the process.

In some embodiments, determining the file system path of the directory associated with the process may involve receiving, from the computing device, data identifying the one or more processes executing on the computing device, where the data includes a representation of the file system path of the directory associated with the process. The data may be parsed to identify therein the representation of the file system path.

In some embodiments, providing the instructions to identify the one or more processes executing on the computing device may include determining an operating system provided by the computing device and determining the instructions to identify the one or more processes executing on the computing device based on the operating system.

In some embodiments, the instructions to scan the one or more directories may include instructions to scan the one or more directories for files of one or more predetermined types.

In some embodiments, a software product corresponding to the process may be determined. Data identifying a mapping between the software product and the one or more directories may be stored by the proxy server application. At a later time, the proxy server application may provide, to the computing device, instructions to identify additional processes executing on the computing device at the later time. When the additional processes include a further process corresponding to the software product, the one or more directories to scan for files associated with the further process may be determined by retrieving the stored data.

In some embodiments, based on the results of the scan, it may be determined that the one or more scanned directories do not contain an executable file associated with the process. Based on determining that the one or more scanned directories do not contain the executable file associated with the process, the process may be identified as a security threat.

In some embodiments, providing instructions to identify the one or more processes executing on the computing device may include providing the instructions to identify the one or more processes executing on the computing device at a first time and providing additional instructions to periodically identify one or more additional processes executing on the computing device at one or more times later than the first time. For the one or more additional processes that were identified at the one or more times later than the first time, file system paths of respective directories associated with the one or more additional processes may be determined.

In some embodiments, instructions to scan the computing device according to predefined criteria may be received. The predefined criteria may include one or more of a predetermined directory, a predetermined file type, and a predetermined file name. Instructions to scan the computing device according to the predefined criterial with a first frequency may be provided. Instructions to (i) identify processes executing on the computing device and (ii) scan directories associated with the identified processes with a second frequency higher than the first frequency may also be provided.

In some embodiments, instructions to scan the computing device according to predefined criteria to identify software products installed on the computing device may be provided. One or more actively-used software products corresponding to the one or more processes executing on the computing device may be determined. Based on a difference between (i) the actively-used software products and (ii) the software products installed on the computing device, one or more unused software products may be identified. Instructions to remove the one or more unused software products from the computing device may be provided.

In some embodiments, at least part of the proxy server application may be disposed on the computing device.

In some embodiments, the representation of the plurality of attributes associated with each file may include a cryptographic hash of the plurality of attributes associated with each file. Based on cryptographic hashes associated with the one or more files, a software product to which the process corresponds may be determined. An identifier of the software product to which the process corresponds may be stored in the database.

In some embodiments, the proxy server application may be provided and/or controlled by a computational instance of the remote network management platform.

X. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A system, comprising:
one or more processors; and
a non-transitory memory storing instructions that, when executed by the one or more processors, causes the one or more processors to perform actions comprising:
receiving an indication of one or more processes executing on a computing device of a managed network;
instructing the computing device to scan a directory associated with the one or more processes for one or more files;
receiving a representation of one or more attributes associated with the one or more files; and
storing, in a configuration management database (CMDB), the one or more attributes associated with the one or more files as one or more configuration items of the managed network, wherein the CMDB comprises a plurality of records corresponding to software products being used in the managed network.

2. The system of claim 1, wherein the actions comprise:
determining that a particular sub-directory of the directory was previously scanned; and
instructing the computing device to scan a portion of the directory other than the particular sub-directory for the one or more files.

3. The system of claim 1, wherein the actions comprise:
determining that a particular sub-directory of the directory was previously scanned;
determining that a threshold amount of time has elapsed since a most recent scan of the particular sub-directory; and
instructing the computing device to scan the particular sub-directory and a portion of the directory other than the particular sub-directory for the one or more files.

4. The system of claim 1, wherein the one or more processors are configured to instruct the computing device to scan the directory at a predetermined frequency, at random times, or in response to a launch of a process of the one or more processes, or a combination thereof.

5. The system of claim 1, wherein the actions comprise:
determining that a hash value for at least one file of the one or more files does not match a reference hash value stored in a hash value database; and
in response to determining that the hash value does not match the reference hash value, providing an indication of the at least one file, a process of the one or more processes, or both, as a potential security threat.

6. The system of claim 5, wherein the actions comprise determining the hash value via a one-way hash function and based on the one or more attributes of the at least one file.

7. The system of claim 1, wherein the actions comprise:
determining that a profile of the directory does not match a previous profile of the directory, wherein the profile indicates a particular number of files, one or more particular files types, one or more particularly named files, or a particular organizational structure of sub-directories, or a combination thereof; and in response to determining that the profile of the directory does not match the previous profile of the directory, providing an indication of a process of the one or more processes as a potential security threat.

8. The system of claim 7, wherein the actions comprise:
executing a predefined criteria-based discovery process to determine the profile of the directory; and
storing the profile of the directory in the CMDB.

9. The system of claim 1, wherein the indication of the one or more processes comprises, for each respective process of the one or more processes, a process identifier (PID), a user account from or by which the respective process was initiated, a start time of the respective process, or a command used to invoke the respective process, or a combination thereof, and wherein the one or more processors are configured to determine the directory associated with the one or more processes based on the indication of the one or more processes.

10. A method, comprising:
receiving, via a processor, an indication of one or more processes executing on a computing device of a managed network;
instructing, via the processor, the computing device to scan a directory associated with the one or more processes for one or more files;
receiving, via the processor, a representation of one or more attributes associated with the one or more files; and
storing, in a configuration management database (CMDB), the one or more attributes associated with the one or more files as one or more configuration items of the managed network, wherein the CMDB comprises a plurality of records corresponding to software products being used in the managed network.

11. The method of claim 10, comprising:
determining, via the processor, that a particular sub-directory of the directory was previously scanned; and
instructing, via the processor, the computing device to scan a portion of the directory other than the particular sub-directory for the one or more files.

12. The method of claim 10, comprising:
determining, via the processor, that a particular sub-directory of the directory was previously scanned;
determining, via the processor, that a threshold amount of time has elapsed since a most recent scan of the particular sub-directory; and
instructing, via the processor, the computing device to scan the particular sub-directory and a portion of the directory other than the particular sub-directory for the one or more files.

13. The method of claim 10, comprising:
determining, via the processor, that a hash value for at least one file of the one or more files does not match a reference hash value stored in a hash value database; and
in response to determining that the hash value does not match the reference hash value, providing, via the processor, an indication of the at least one file, a process of the one or more processes, or both, as a potential security threat.

14. The method of claim 13, comprising determining, via the processor, the hash value via a one-way hash function and based on the one or more attributes of the at least one file.

15. The method of claim 10, wherein the indication of the one or more processes comprises, for each respective process of the one or more processes, a process identifier (PID), a user account from or by which the respective process was initiated, a start time of the respective process, or a command used to invoke the respective process, or a combination thereof, and comprising determining the directory associated with the one or more processes based on the indication of the one or more processes.

16. A non-transitory computer-readable medium comprising computer readable instructions, that when executed by one or more processors, causes the one or more processors to perform operations comprising:
receiving, via a processor of the one or more processors, an indication of one or more processes executing on a computing device of a managed network;
instructing, via the processor, the computing device to scan a directory associated with the one or more processes for one or more files;
receiving, via the processor, a representation of one or more attributes associated with the one or more files; and
storing, in a configuration management database (CMDB), the one or more attributes associated with the one or more files as one or more configuration items of the managed network, wherein the CMDB comprises a plurality of records corresponding to software products being used in the managed network.

17. The non-transitory computer-readable medium of claim 16, wherein the operations comprise:
determining, via the processor, that a particular sub-directory of the directory was previously scanned; and
instructing, via the processor, the computing device to scan a portion of the directory other than the particular sub-directory for the one or more files.

18. The non-transitory computer-readable medium of claim 16, wherein the operations comprise:
determining, via the processor, that a particular sub-directory of the directory was previously scanned;
determining, via the processor, that a threshold amount of time has elapsed since a most recent scan of the particular sub-directory; and
instructing, via the processor, the computing device to scan the particular sub-directory and a portion of the directory other than the particular sub-directory for the one or more files.

19. The non-transitory computer-readable medium of claim 16, wherein the operations comprise instructing, via the processor, the computing device to scan the directory at a predetermined frequency, at random times, or in response to a launch of a process of the one or more processes, or a combination thereof.

20. The non-transitory computer-readable medium of claim 16, wherein the operations comprise:
determining, via the processor, that a profile of the directory does not match a previous profile of the directory, wherein the profile indicates a particular number of files, one or more particular files types, one or more particularly named files, or a particular organizational structure of sub-directories, or a combination thereof; and
in response to determining that the profile of the directory does not match the previous profile of the directory, providing an indication of a process of the one or more processes as a potential security threat.

* * * * *